May 12, 1931. T. SAMSON 1,805,376
SEED POTATO CUTTER
Filed Feb. 19, 1930 5 Sheets-Sheet 1
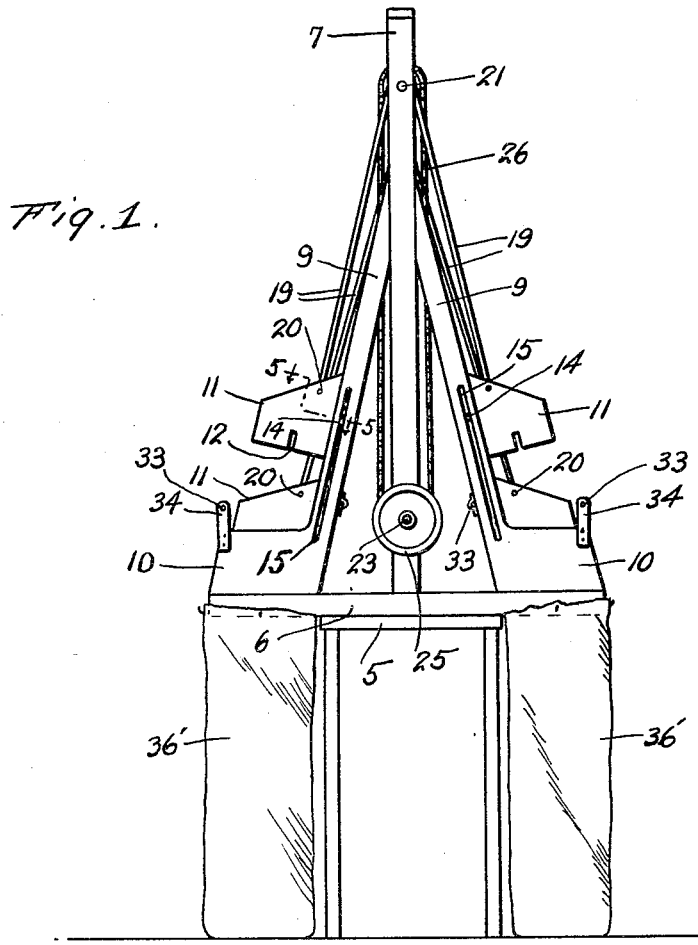
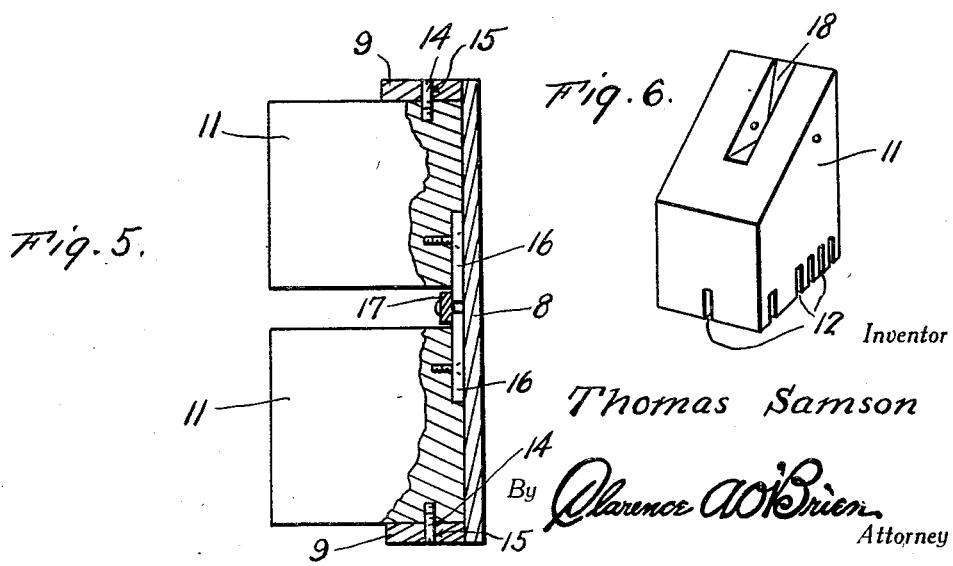
Inventor
Thomas Samson
By Clarence A. O'Brien
Attorney

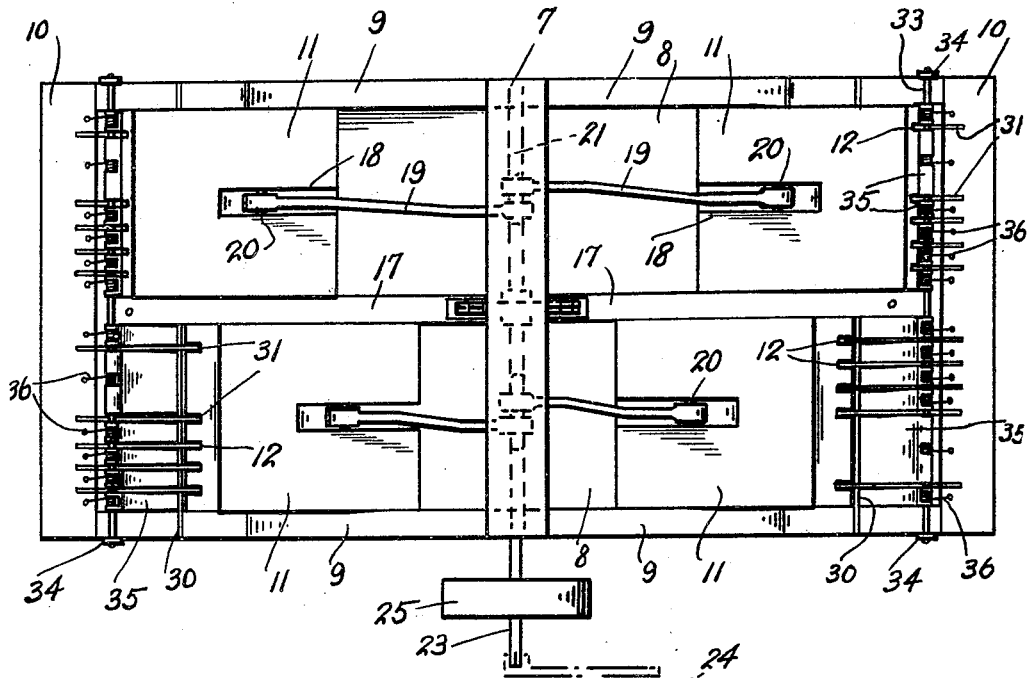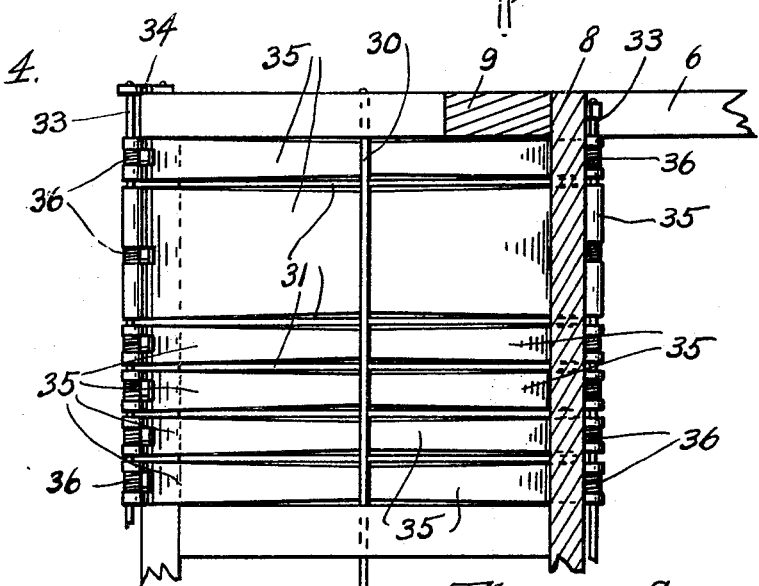

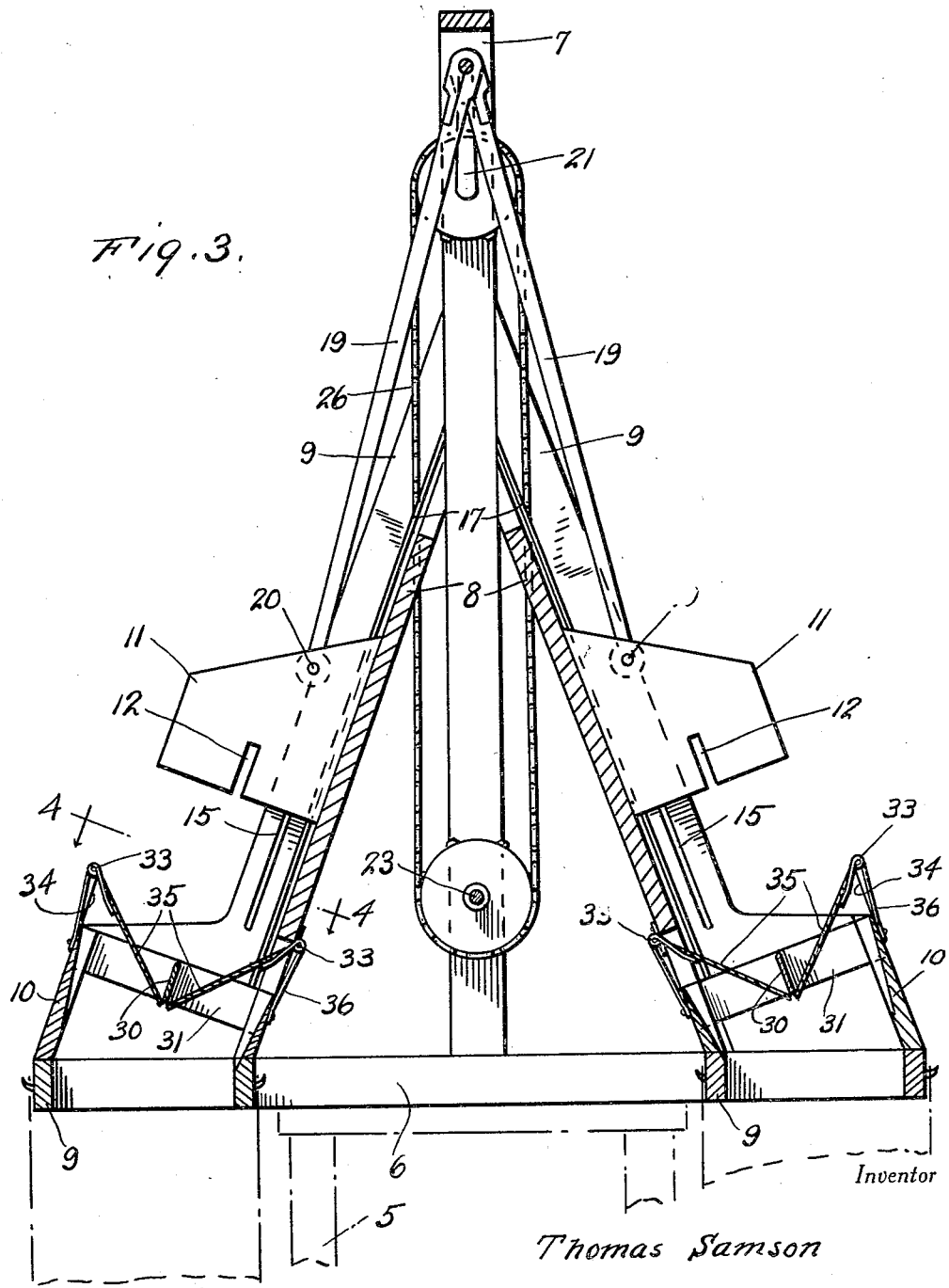

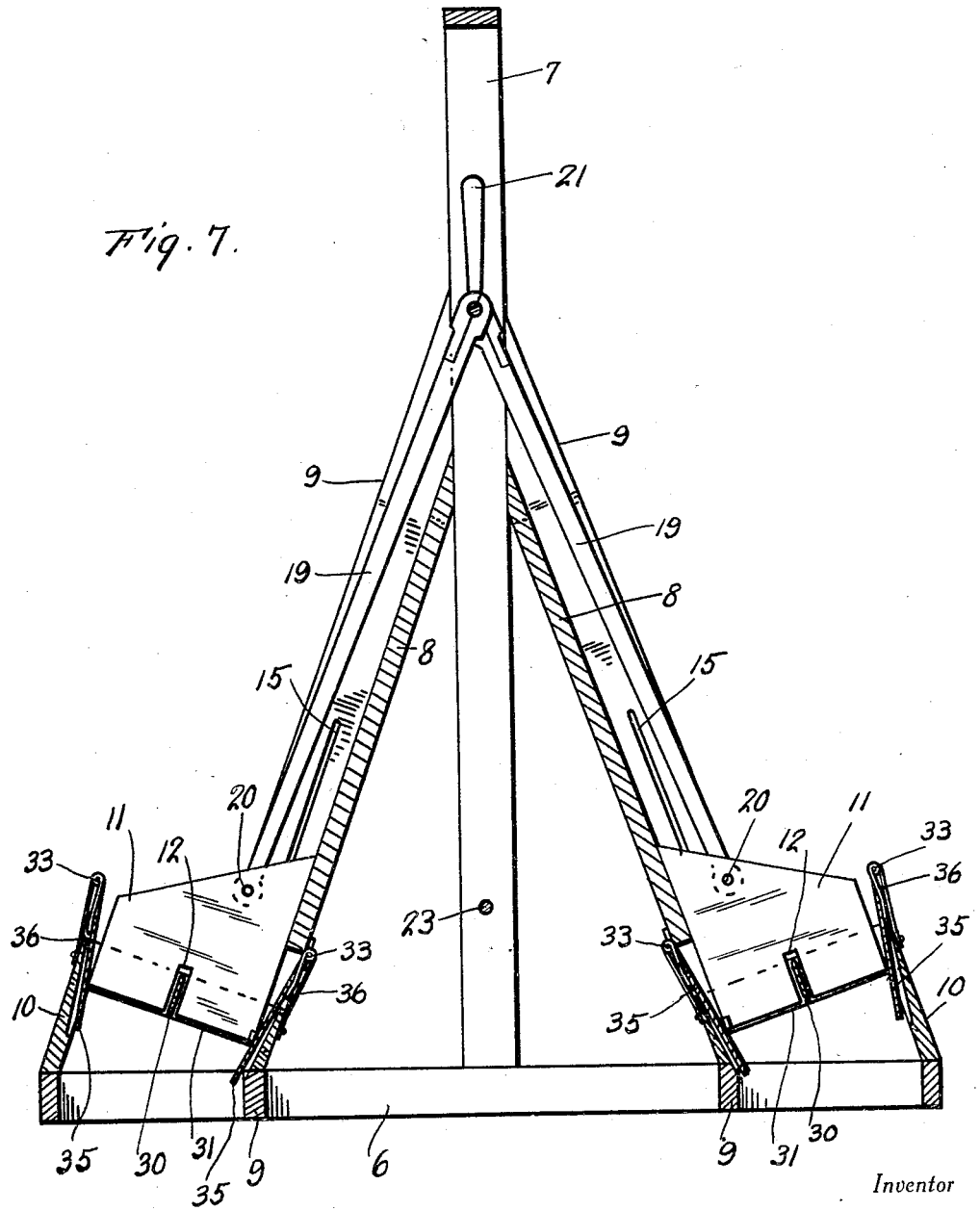

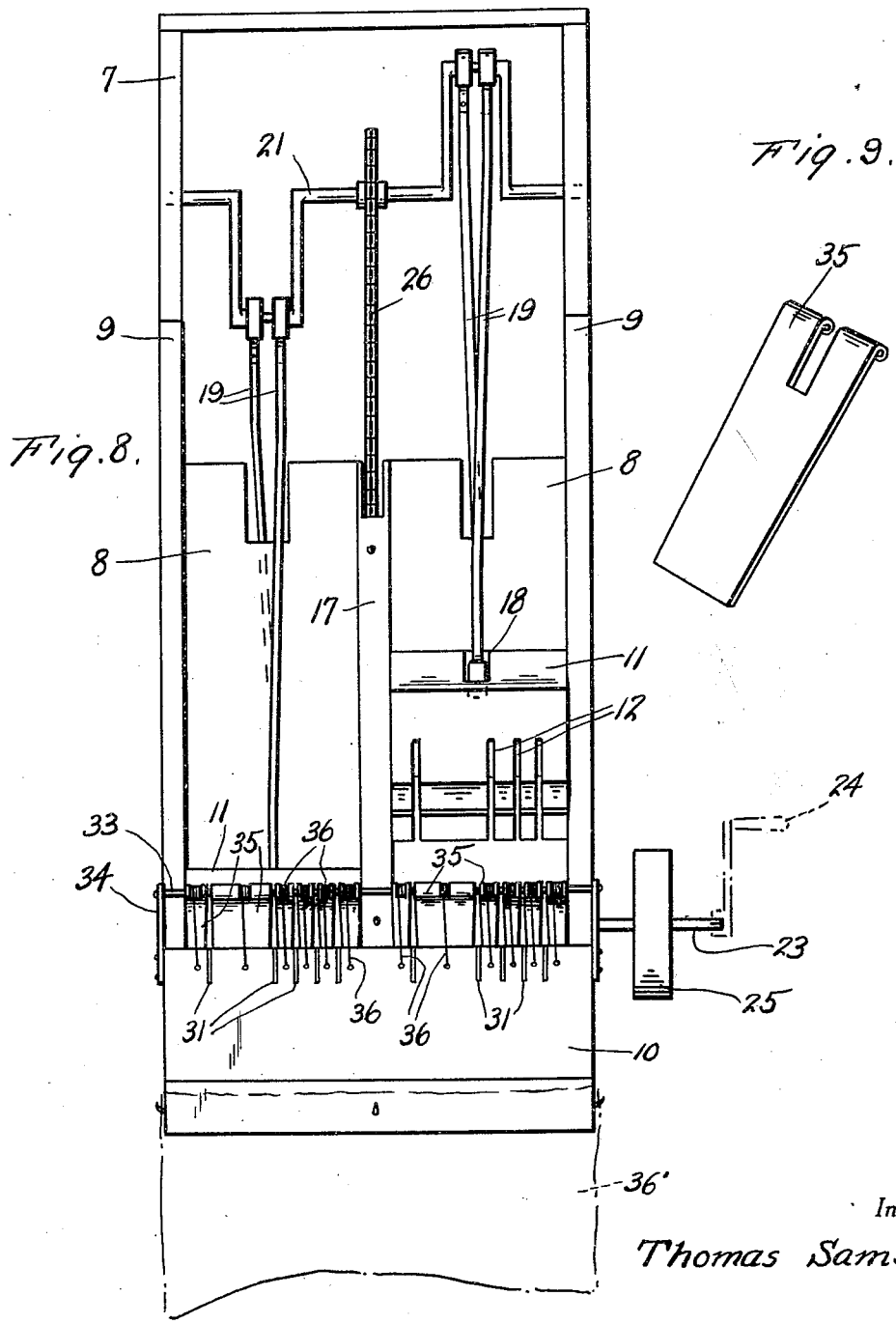

Patented May 12, 1931

1,805,376

UNITED STATES PATENT OFFICE

THOMAS SAMSON, OF GRAFTON, NORTH DAKOTA

SEED POTATO CUTTER

Application filed February 19, 1930. Serial No. 429,681.

The present invention relates to a seed potato cutter and has for its prime object to provide a mechanism whereby seed potatoes may be cut up in a quick and expeditious manner and deposited into sacks or the like.

Another very important object of the invention resides in the provision of a cutting mechanism of this nature which is simple in its construction, inexpensive to manufacture, strong and durable, easy to operate, thoroughly efficient and reliable in use and operation, and otherwise well adapted to the purpose for which it is desired.

With the above and numerous other objects in view as will appear as the description proceeds, the invention resides in certain novel features of construction, and in the combination and arrangement of parts as will be hereinafter more fully described and claimed.

In the drawings:

Figure 1 is an end elevation of the mechanism embodying the features of my invention, Figure 2 is a top plan view thereof, Figure 3 is a vertical longitudinal section therethrough, Figure 4 is a detail section taken substantially on the line 4—4 of Figure 3, Figure 5 is a detail section taken substantially on the line 5—5 of Figure 1, Figure 6 is a perspective view of one of the follower blocks, Figure 7 is a vertical longitudinal section through the mechanism showing another pair of the follower blocks and the pair shown in Figure 3 and in a different position, Figure 8 is a side elevation of the mechanism, Figure 9 is a perspective view of one of the guide plates.

Referring to the drawings in detail it will be seen that the numeral 5 denotes a supporting structure such as a table or the like on which is mounted a horizontal frame 6 from the center of which rises a vertical frame 7. A pair of plates 8 rise from cross members 9 in the frame 6 and incline upwardly toward each other being connected to the frame 7 intermediate its ends.

Side boards 9 are provided on the side edges of the plates 8. Box like structures 10 are formed on the sides of the frame 6 and incline upwardly and inwardly similar to the plates 8, the bottom portions of the plates 8 forming the inner walls thereof. On each plate 8 there is slidable a pair of blocks 11 having a plurality of groove 12 in the bottom surface thereof.

Pins 14 are anchored in the outer sides of the blocks and extend through longitudinal slots 15 formed in the side boards 9. Lugs 16 are anchored in notches formed in the inner or rear faces of the blocks and extend beyond the adjacent sides thereof under a strip 17 mounted on the board or plate 8. In the upper portion in each block is a notch 18 into which the lower end of a pitman 19 is journalled by means of a pin 20.

A double crank shaft 21 is journalled in the upper portion of the frame 7. A pair of pitmen 19 are engaged with each crank of the crank shaft. Preferably one crank is disposed in an opposite direction to the other crank to afford balance in the operation of the mechanism. A shaft 23 is journalled through the lower portion of the frame 7 and is operable by a hand crank 24 or by a pulley 25 from suitable motive power.

A chain and sprocket connection 26 is provided between the shafts 23 and 21. Therefore as the shaft 23 is rotated the crank shaft 21 is rotated and the blocks 11 are reciprocated up and down.

In each box like structure 10 there is an elongated cross knife 30 and a plurality of short longitudinal knives 31. Some of these knives 31 are spaced somewhat close together as is clearly shown in Figure 4. It will therefore be seen that by placing potatoes on the blade 30 a potato may be cut into halves, quarters, or a larger number of smaller parts depending upon how the potato is situated on the blade 30 with respect to the blades 31.

The follower block 11, of course, has the groove 12 arranged to receive the blades 30 and 31. Rods 33 are carried by brackets 34 on the front and rear of each box like structure and plates 35 are rockable thereon and extend downwardly between the blades 31 and are limited in their upward movement by the blade 30.

These guide plates 35 are normally held against the blade 30 by means of springs 36 on the rods 34. When a follower block moves from the position shown in Figure 3 to the position shown in Figure 7 it will be seen that the block forces the guide plates downwardly so that the severed parts of the potato may fall into a sack or like receptacle 36 which may be hung from the frame 6.

From the above detailed description it will be seen that two persons may be occupied with this mechanism one to each side thereof placing the potatoes under the pairs of follower blocks as they reciprocate, locating the potatoes on the knives in accordance with the number of parts it is desired to cut the potatoes. In this way it will be seen that these potatoes may be cut up in an easy expeditious manner with accuracy and economy. The apparatus is simple in its construction, and therefore may be manufactured at a low cost and is not likely to easily become out of order.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In a mechanism of the class described, a horizontal frame, a vertical frame rising from the central portion of the horizontal frame, a pair of plates rising upwardly from the horizontal frame and alining inwardly toward each other to the vertical frame, a plurality of blades associated with the lower portion of each plate, said blades being arranged in cross relationship, follower blocks slidable on the plate, pitmen engaged with the follower blocks, a crank shaft journaled in the vertical frame with which said pitmen are engaged, said pitmen to straddle said vertical train in a manner to afford reciprocatory movement of the follower blocks in their respective inclined plates, on the opposite sides of the vertical frame, means for rotating the crank shaft to cause reciprocation of the follower block, said follower block having grooved faces to receive the blades, side boards on the plates having longitudinally extending slots, and pins extending from the block through the slots, a strip extending along the center of each plate, and lugs extending inwardly from the block under the strip, box like structures on the lower portions of the plates for engaging the blades, rods extending along the inner and outer sides of the box like structures, guide plates rockably mounted on said rods extending between the blades, and springs urging the guide plates upwardly against the under side of the blade.

In testimony whereof I affix my signature.

THOMAS SAMSON.